(12) United States Patent
Barad

(10) Patent No.: US 10,382,846 B2
(45) Date of Patent: Aug. 13, 2019

(54) AVIONICS UNIT

(71) Applicant: AIRBUS OPERATIONS LIMITED, Bristol (GB)

(72) Inventor: Kayvon Barad, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 55 days.

(21) Appl. No.: 15/491,080

(22) Filed: Apr. 19, 2017

(65) Prior Publication Data

US 2017/0303018 A1    Oct. 19, 2017

(30) Foreign Application Priority Data

Apr. 19, 2016   (GB) .................................. 1606820.7

(51) Int. Cl.
| | |
|---|---|
| *H04B 17/00* | (2015.01) |
| *H04Q 11/00* | (2006.01) |
| *G02B 6/42* | (2006.01) |
| *H04B 10/27* | (2013.01) |
| *H04B 10/079* | (2013.01) |
| *H04J 14/02* | (2006.01) |
| *H04L 29/08* | (2006.01) |
| *G02B 6/27* | (2006.01) |

(52) U.S. Cl.
CPC ......... *H04Q 11/0066* (2013.01); *G02B 6/425* (2013.01); *G02B 6/4206* (2013.01); *G02B 6/4215* (2013.01); *G02B 6/4246* (2013.01); *H04B 10/27* (2013.01); *G02B 6/2746* (2013.01); *G02B 6/4208* (2013.01); *H04B 10/07957* (2013.01); *H04J 14/0212* (2013.01); *H04L 67/12* (2013.01); *H04Q 2011/0083* (2013.01)

(58) Field of Classification Search
CPC .............. H04Q 11/0066; G02B 6/4206; G02B 6/4215; G02B 6/4246; G02B 6/425
USPC ........................................................... 398/34
See application file for complete search history.

(56) References Cited

U.S. PATENT DOCUMENTS

| | | | | |
|---|---|---|---|---|
| 3,614,314 | A * | 10/1971 | Rossire .................... | A42B 3/04 348/115 |
| 6,282,005 | B1 * | 8/2001 | Thompson ........... | H04B 10/505 359/254 |
| 6,404,956 | B1 | 6/2002 | Brennan, III et al. | |
| 2002/0097466 | A1 * | 7/2002 | Mao ....................... | G02B 6/272 398/83 |
| 2002/0176140 | A1 | 11/2002 | Davis | |
| 2002/0181831 | A1 | 12/2002 | Myers et al. | |
| 2005/0100338 | A1 | 5/2005 | Yeon et al. | |

(Continued)

FOREIGN PATENT DOCUMENTS

WO          0002077 A1       1/2000

*Primary Examiner* — Tesfaldet Bocure
(74) *Attorney, Agent, or Firm* — Jenkins, Wilson, Taylor & Hunt, P.A.

(57) ABSTRACT

An avionics unit for an avionics network is disclosed having a light emitter to provide a modulated broadband optical signal. The avionics unit also includes a first optical interface and a second optical interface. The first optical interface is optically connected to the light emitter and is to receive a removable wavelength selective filter to extract a modulated narrowband optical signal from the modulated broadband optical signal. The second optical interface is optically connected to the first optical interface and is to output the modulated narrowband optical signal.

21 Claims, 8 Drawing Sheets

(56) References Cited

U.S. PATENT DOCUMENTS

2011/0141459 A1  6/2011 Onoda et al.
2013/0266321 A1  10/2013 Park et al.
2017/0303016 A1* 10/2017 Barad ................ H04Q 11/0005

* cited by examiner

AVIONICS UNIT

RELATED APPLICATIONS

The present application claims priority from Great Britain Application No. 1606820-7, filed Apr. 19, 2016, the disclosure of which is hereby incorporated by reference herein in its entirety.

TECHNICAL FIELD

The present invention relates to avionics units, avionics networks comprising such avionics units, and to methods of operating such avionics networks.

BACKGROUND

In many communications applications, such as avionics networks, it is desirable to use optical signals to communicate signals between nodes of the network. Optical communications may provide a lighter alternative to electronic communications, may provide higher resistance to electromagnetic interference (EMI) and background noise, and may provide higher communication speeds.

Some communications networks may use wavelength division multiplexing (WDM) whereby different nodes of the network are allocated different wavelengths at which they transmit optical signals. In some applications, different nodes may transmit signals at different frequencies along the same optical communications path, such as a common optical fibre.

In some critical applications, such as aircraft avionics networks, each type of node that is to be used in the network must pass rigorous testing. Such testing may involve significant costs and so it may be desirable to reduce the number of types of node that must undergo such testing.

SUMMARY

A first aspect of the present invention provides an avionics unit for an avionics network, the avionics unit comprising: a light emitter to provide a modulated broadband optical signal; a first optical interface optically connected to the light emitter, the first optical interface being to receive a removable wavelength selective filter to extract a modulated narrowband optical signal from the modulated broadband optical signal; and a second optical interface optically connected to the first optical interface, the second optical interface being to output the modulated narrowband optical signal.

Optionally, the avionics unit comprises an optical circulator, the optical circulator comprising a first port optically connected to the light emitter, a second port optically connected to the first optical interface, and a third port optically connected to the second optical interface.

Optionally, the avionics unit comprises a light detector, wherein the optical circulator comprises a fourth port optically connected to the light detector.

Optionally, the avionics unit comprises a third optical interface to receive a removable wavelength selective filter to extract a narrowband optical signal from an optical signal received at the second optical interface; and a light detector optically connected to the third optical interface, the light detector being to detect the narrowband optical signal extracted from the optical signal received at the second optical interface.

Optionally, the avionics unit comprises a first optical circulator, a second optical circulator and a third optical circulator, wherein the first, second and third optical circulators each comprise a first port, a second port and a third port, wherein: the first port of the first optical circulator is optically connected to the light emitter, the second port of the first optical circulator is optically connected to the first port of the second optical circulator, and the third port of the first optical circulator is optically connected to the light detector; the second port of the second optical circulator is optically connected to the first port of the third optical circulator, and the third port of the second optical circulator is optically connected to the third optical interface; and the second port of the third optical circulator is optically connected to the first optical interface, and the third port of the third optical circulator is optically connected to the second optical interface.

Optionally, the avionics unit comprises a an optical circulator, the optical circulator comprising: a first port optically connected to the light emitter; a second port optically connected to the first optical interface; a third port optically connected to the second optical interface; a fourth port optically connected to the third optical interface; and a fifth port optically connected to the light detector.

Optionally, the light emitter is a broadband laser diode.

Optionally, the light emitter is a white-light LED.

Optionally, the light detector is one of a phototransistor, a photodiode, an active pixel sensor, a charge-coupled device and a direct-conversion radiation detector.

Optionally, the third optical interface comprises an expanded beam connector

Optionally, at least one of the first and second optical interfaces comprises an expanded beam connector.

Optionally, the avionics unit is a Line Replaceable Unit.

A second aspect of the present invention provides a system comprising: an avionics unit according to the first aspect of the present invention and a removable wavelength selective filter to optically connect to the first optical interface of the avionics unit, the wavelength selective filter being to extract a modulated narrowband optical signal from the modulated broadband optical signal provided by the light emitter of the avionics unit.

Optionally, the wavelength selective filter is optically connected to the first optical interface of the avionics unit.

Optionally, the removable wavelength selective filter comprises a fibre Bragg grating.

Optionally, the wavelength selective filter comprises a non-reflective termination.

A third aspect of the present invention provides an avionics network, comprising: an avionics unit according to the first aspect of the present invention, or a system according to the second aspect of the present invention; and an optical wiring harness, wherein the avionics unit is optically connected to the optical wiring harness.

Optionally, the optical wiring harness comprises the removable wavelength selective filter.

Optionally, the avionics network comprises a plurality of the avionics units and a plurality of the removable wavelength selective filters; wherein a first of the avionics units is optically connected to a first of the removable wavelength selective filters, and a second of the avionics units is optically connected to a second of the removable wavelength selective filters; wherein the first removable wavelength selective filter is arranged to extract a first wavelength, and the second removable wavelength selective filter is arranged to extract a second wavelength, different to the first wavelength.

Optionally, the avionics network is an Integrated Modular Avionics network.

A fourth aspect of the present invention provides an optical wiring harness for an avionics network, the optical wiring harness comprising: a first optical terminal comprising a wavelength selective filter for receiving a broadband modulated optical signal and transmitting a corresponding narrowband modulated optical signal; and a second optical terminal to receive the narrowband modulated optical signal.

Optionally, the wavelength selective filter comprises a fibre Bragg grating.

Optionally, the wavelength selective filter comprises a non-reflective termination.

A fifth aspect of the present invention provides method of operating an avionics network according to the third aspect of the present invention, the method comprising: modulating the light emitter to provide a modulated broadband optical signal; filtering, using the removable wavelength selective filter optically connected to the first optical interface, the modulated broadband optical signal to provide a modulated narrowband optical signal having a wavelength assigned to the avionics unit; and transmitting the modulated narrowband optical signal from the avionics unit via the second optical interface.

Optionally, the avionics unit comprises a light detector, and a third optical interface optically connected to a removable wavelength selective filter to extract a narrowband optical signal from an optical signal received at the second optical interface, and the method comprises: receiving a broadband optical signal via the second optical interface: filtering, using the removable wavelength selective filter optically connected to the third optical interface, the broadband optical signal to extract a modulated narrowband optical signal; and detecting the extracted modulated narrowband optical signal using the light detector.

Optionally, the extracted modulated narrowband optical signal has a wavelength different to the wavelength assigned to the avionics unit.

A sixth aspect of the present invention provides a vehicle comprising an avionics unit according to the first aspect of the present invention, or a system according to the second aspect of the present invention, or an avionics network according to the third aspect of the present invention, or a wiring harness according to the fourth aspect of the present invention.

Optionally, the vehicle of the sixth aspect of the present invention is an aircraft.

BRIEF DESCRIPTION OF THE DRAWINGS

Embodiments of the invention will now be described, by way of example only, with reference to the accompanying drawings, in which.

DETAILED DESCRIPTION

Figure 1:
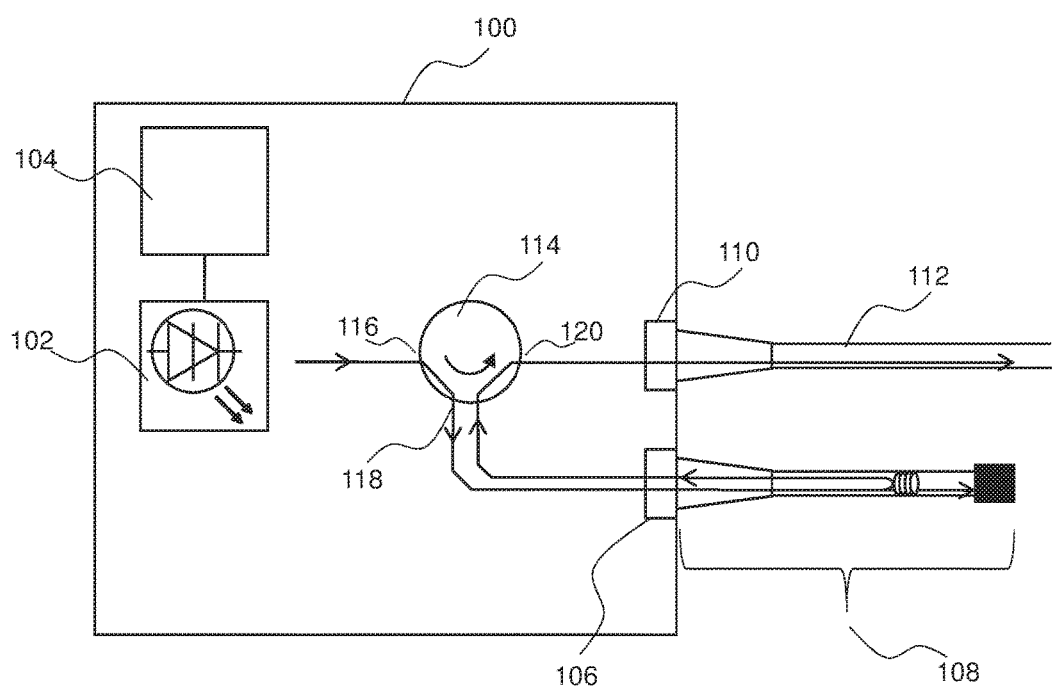
FIG. 1 is a schematic diagram illustrating an example of an avionics unit of an embodiment of the invention.

FIG. 1 is a schematic diagram illustrating an example of an avionics unit 100 according to an embodiment of the invention. The avionics unit 100 is arranged to transmit an optical signal via an optical network, such as an optical integrated avionics network.

The avionics unit 100 comprises a light emitter 102. The light emitter 102 is arranged to provide a modulated broadband optical signal. For example, the light emitter 102 may be connected to a controller 104 and the controller 104 may modulate the light emitter 102 to provide a modulated output having a modulation pattern corresponding to data to be transmitted.

The avionics unit 100 also comprises optical interfaces. A first optical interface 106 is optically connected to the light emitter 102. The first optical interface 106 is arranged to receive a removable wavelength selective filter 108. The removable wavelength selective filter 108 is arranged to extract a narrowband optical signal from the modulated broadband optical signal provided by the light emitter 102.

The first optical interface 106 is also optically connected to a second optical interface 110. The second optical interface 110 is to output the modulated narrowband optical signal. For example, the second optical interface 110 may be arranged to receive, or otherwise cooperate with, an optical fibre 112 that is connected to an optical network, such as an optical integrated avionics network.

In this embodiment, the avionics unit 100 comprises an optical circulator 114 to optically connect the light emitter 102 to the first optical interface 106, and to optically connect the first optical interface 106 to the second optical interface 110.

An optical circulator is a non-reciprocal, directional device that may comprise three or more ports for receiving and transmitting light. Light entering an optical circulator in any one of the port exits the optical circulator only from the next port in a sequential manner.

The optical circulator 114 of this embodiment comprises three ports, 116, 118, 120. A first port 116 is optically connected to the light emitter 102, a second port 118 is optically connected to the first optical interface 106, and a third port 120 is optically connected to the second optical interface 110.

The light emitter 102 emits light having a relatively wide bandwidth. For example, the light emitter 102 may have a power spectrum having a full-width-half-maximum of greater than 100 nanometers. In some examples, the light emitter 102 may have a power spectrum having a full-width-half-maximum of greater than 500 nanometers. In some examples the light emitter 102 may emit light in visible and non-visible portions of the electromagnetic spectrum.

Light may be emitted by the light emitter 102 in any wavelength range. For example, light emitted by the light emitter 102 may be visible, infrared, near-infrared, or ultraviolet light, or a combination thereof. In some embodiments, light emitted by the light emitter 102 may have a wavelength range selected to satisfy existing WDM standards, such as Coarse Wavelength Division Multiplexing (CWDM) or Dense Wavelength Division Multiplexing (DWDM). In some embodiments, light emitted by the light emitter 102 may have a wavelength range selected to be compatible with other nodes of the avionics network.

In some examples, the light emitter 102 may be a broadband laser or light emitting diode. For example, the light emitter 102 may be a semiconductor laser arranged to generate laser light over a range of several tens or hundreds of nanometers. In some examples, the laser may comprise multiple quantum wells, each quantum well providing different quantum confined states from other quantum wells, resulting in emission at a different wavelength.

In some examples, the light emitter 102 may comprise a plurality of lasers each arranged to provide laser light at a different wavelength to other lasers in the plurality of lasers, such that the combined spectrum of the light emitter 102 comprises multiple narrowband peaks covering a wide range of wavelengths.

In some examples, the light emitter 102 may be a white light LED. For example, the light emitter 102 may comprise a blue emitting LED and a phosphor coating to provide substantially white light (i.e. light having wavelength components across the visible spectrum).

In some examples, the light emitter 102 may comprise a resistive element arranged to emit light over a broad range of wavelengths when current flows through the resistive element. For example, the light emitter 102 may be a tungsten filament lamp.

In some examples, the wavelength selective filter 108 may comprise a fibre Bragg grating (FBG) in which the periodicity of the refractive index of the grating is arranged to produce relatively high reflectivity over a narrow range of wavelengths and relatively low reflectivity at other wavelengths within the bandwidth of the light emitter 102. Such a grating reflects a desired wavelength efficiently and transmits unwanted wavelengths efficiently. That is, the grating does not reflect the unwanted wavelengths.

Figure 2A:
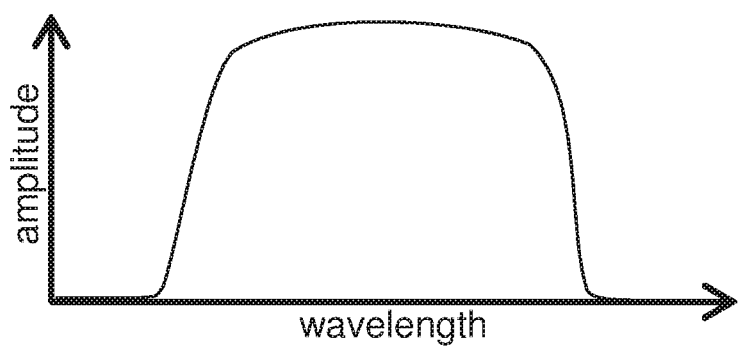
FIG. 2a is a schematic diagram illustrating a power spectrum of an example of a light emitter.
Figure 2B:
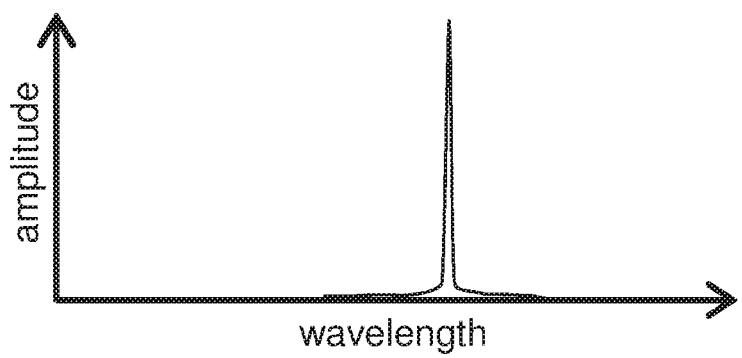
FIG. 2b is a schematic diagram illustrating a filtered power spectrum of an example of a light emitter.

FIGS. 2a and 2b are schematic diagrams illustrating examples of the effect of the wavelength selective filter 108. FIG. 2a is a schematic diagram illustrating the power spectrum of the light emitter 102. Light emitted by the light emitter 102 is broadband, meaning that, as described above, it extends across a relatively wide range of wavelengths. FIG. 2b is a power spectrum of light that has been filtered by the wavelength selective filter 108. The full width half maximum of the spectrum shown in FIG. 2b is relatively much narrower than the full width half maximum of the spectrum shown in FIG. 2a.

By providing the avionics unit 100 with a light emitter 102 that emits broadband light and selectively filtering the light to provide a narrowband optical signal with the removable wavelength selective filter 108, the avionics unit 100 can be tuned to provide or transmit a narrowband optical signal. By removing the removable wavelength selective filter 108 and replacing it with a wavelength selective filter 108 tuned to a different one of a selection of wavelengths, the wavelength of signals transmitted by the avionics unit 100 via the second optical interface 110 can be changed. That is, the wavelength of signals transmitted by the avionics unit 100 via the second optical interface 110 is tuneable on the basis of the wavelength selective filter 108 connected to the first optical interface 106. In this way, identical or generic avionics units 100 can be paired with wavelength selective filters 108 that are tuned to respective different wavelengths, so that the generic avionics units 100 may be used with optical networks utilising wavelength division multiplexing (WDM).

In critical applications, such as aircraft avionics, each type of avionics unit 100 may have to undergo significant levels of testing before being approved for use. Such testing may involve significant levels of cost. Furthermore, each type of avionics unit needs to be stocked at operating locations where the avionics unit may need to be replaced. Therefore, a generic avionics unit 100 that can be used in optical networks that utilise WDM may reduce the cost of putting avionics units into service. Furthermore, such a generic avionics unit may reduce levels of stock held at operating locations and/or may reduce the time taken to restore an optical network (and a vehicle in which the network operates) to service when maintenance is required.

Furthermore, use of the wavelength selective filter 108 in combination with the relatively broadband light emitter 102 may enable the wavelength of an output optical signal to be tuned with reduced cooling and temperature regulation, with reduced levels of active control, and/or with reduced levels of power consumption.

In use, the avionics unit 100 may be part of an avionics network. The avionics network may comprise one or more avionics units 100 and one or more optical wiring harnesses.

Figure 3:
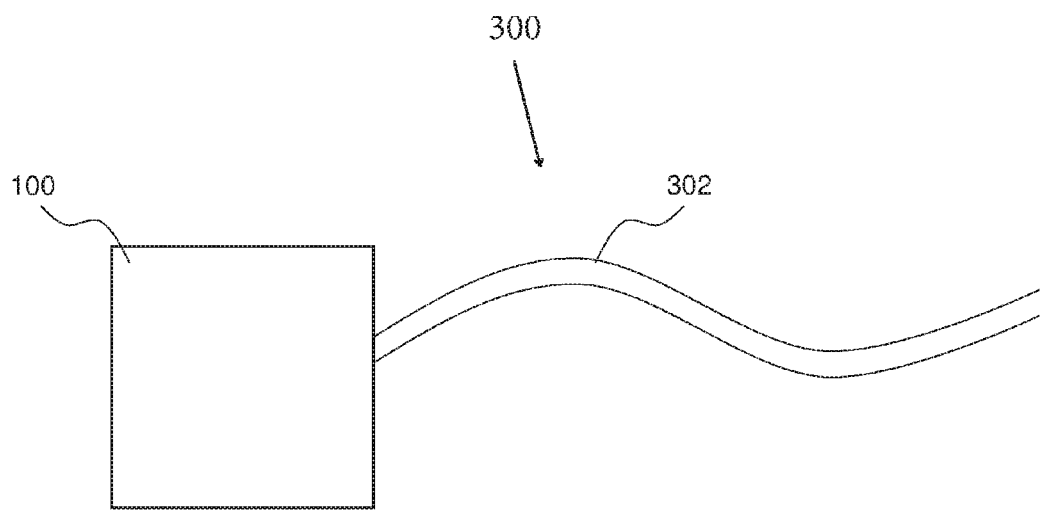
FIG. 3 is a schematic diagram illustrating an example of an avionics network of an embodiment of the invention.

FIG. 3 is a schematic diagram illustrating an exemplary avionics network 300 comprising an avionics unit 100 and an optical wiring harness 302, in accordance with an embodiment of the invention. In use, the avionics unit 100 is optically connected to the optical wiring harness 302. For example, the avionics unit 100 may be optically connected to the optical wiring harness 302 via the second optical interface 110.

The optical wiring harness 302 may comprise one or more optical fibres to carry optical signals, such as optical signals provided by the avionics unit 100, across at least part of the avionics network 300. In some examples, the optical wiring harness 302 may comprise the removable wavelength selective filter 108. For example, a wavelength selective filter 108 tuned to a wavelength assigned to a node at which the avionics unit 100 is to operate may be formed in a connector at an end of the optical wiring harness 302. In this way, the possibility of using an incorrect wavelength selective filter 108 at any given node of the avionics network 300 may be reduced or avoided. In other examples, the wavelength selective filter 108 may be provided separately to the optical wiring harness 302.

Figure 4:
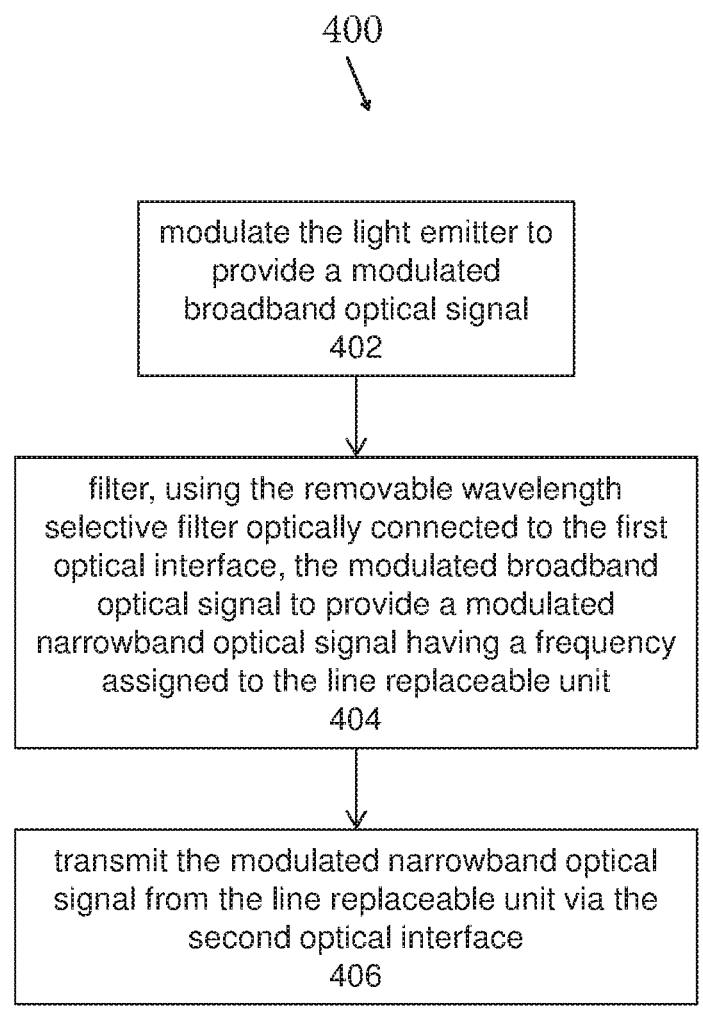
FIG. 4 is a flow diagram illustrating a method of operating an avionics network of an embodiment of the invention.

FIG. 4 is a flow diagram illustrating an example method 400 of operating an avionics network, such as the avionics network 300 described with reference to FIG. 3, in accordance with an embodiment of the invention.

At block 402, the light emitter 102 is modulated to provide a modulated broadband optical signal. The broadband optical signal is transmitted from the light emitter 102 to the removable wavelength selective filter 108. For example, the broadband optical signal may be received at the first port 116 of the optical circulator 114 and transmitted from the second port 118 of the optical circulator 114 to the removable wavelength selective filter 108.

At block 404, the modulated broadband optical signal is filtered, using the removable wavelength selective filter 108, to provide a modulated narrowband optical signal having a wavelength assigned to the avionics unit 100. The wavelength is determined by the wavelength to which the wavelength selective filter 108 is tuned, as discussed above.

At block 406, the modulated narrowband optical signal is transmitted from the avionics unit 100 via the second optical interface 110. For example, the modulated narrowband optical signal may be received at the second port 118 of the optical circulator 114 from the wavelength selective filter 108, and transmitted from the third port 120 of the optical circulator 114 to the second optical interface 110, whereupon it may be transmitted via the second optical interface 110 to the optical wiring harness 302.

Figure 5:
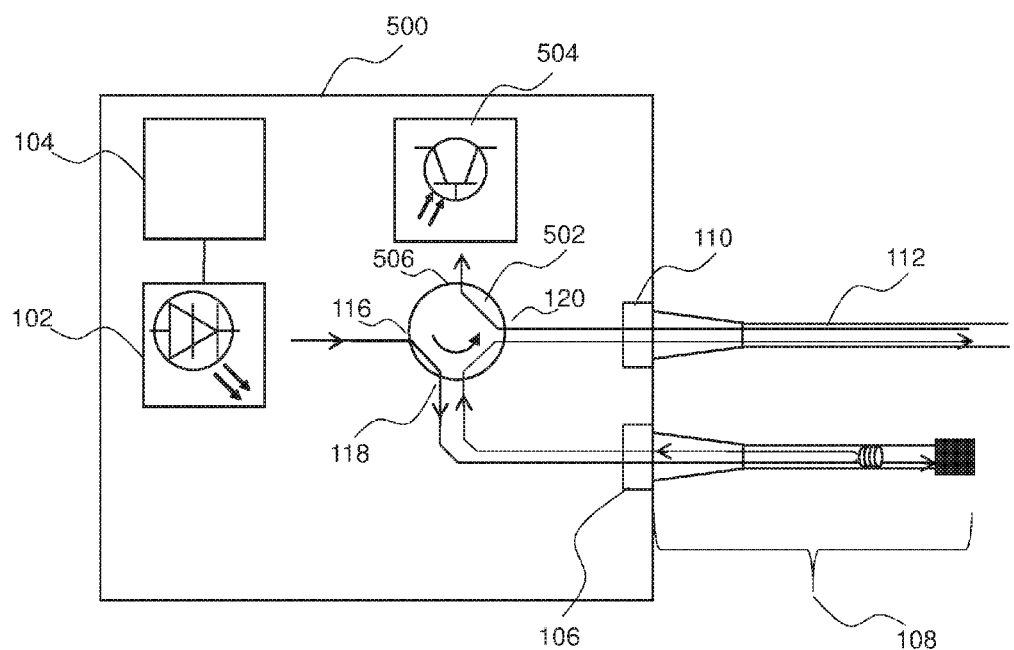
FIG. 5 is a schematic diagram illustrating an example of an avionics unit of an embodiment of the invention.

FIG. 5 is a schematic diagram illustrating an example avionics unit 500 according to an embodiment of the invention. The avionics unit 500 is arranged to transmit optical signals across an optical network, such as the avionics network 300 described with reference to FIG. 3, and receive optical signals from the optical network.

The avionics unit 500 comprises a light emitter 102, a first optical interface 106, and a second optical interface 110, similarly to the avionics unit 100 described with reference to FIG. 1. The avionics unit 500 shown in FIG. 5 also comprises a controller 104 to modulate the light emitter 102, in a manner similar to that described above with reference to FIG. 1.

In addition, the avionics unit 500 comprises an optical circulator 502 and a light detector 504. Similarly to the optical circulator 114 described with reference to FIG. 1, the optical circulator 502 shown in FIG. 5 comprises a first port 116 optically connected to the light emitter 102, a second port 118 optically connected to the first optical interface 106, and a third port 120 optically connected to the second optical interface 110. Additionally, the optical circulator 502 shown in FIG. 5 comprises a fourth port 506 that is optically connected to the light detector 504.

In the embodiment shown in FIG. 5, the light detector 504 may be a detector that can distinguish optical signals originating from different sources. For example, the light detector 504 may comprise plural sensing elements each sensitive to a particular wavelength range. In other examples, the light detector 504 may be sensitive to a wide range of wavelengths and may comprise optical components for spectrally analysing or de-multiplexing light prior to detection.

In use, light received at the second interface 110 is transmitted to the third port 120 of the optical circulator 502 and transmitted from the fourth port 506 to the light detector 504. This enables the avionics unit 500 shown in FIG. 5 to both transmit optical signals across the optical network 300 and receive optical signals transmitted across the optical network 300 such as, for example, signals transmitted by other nodes of the network 300.

Figure 6:
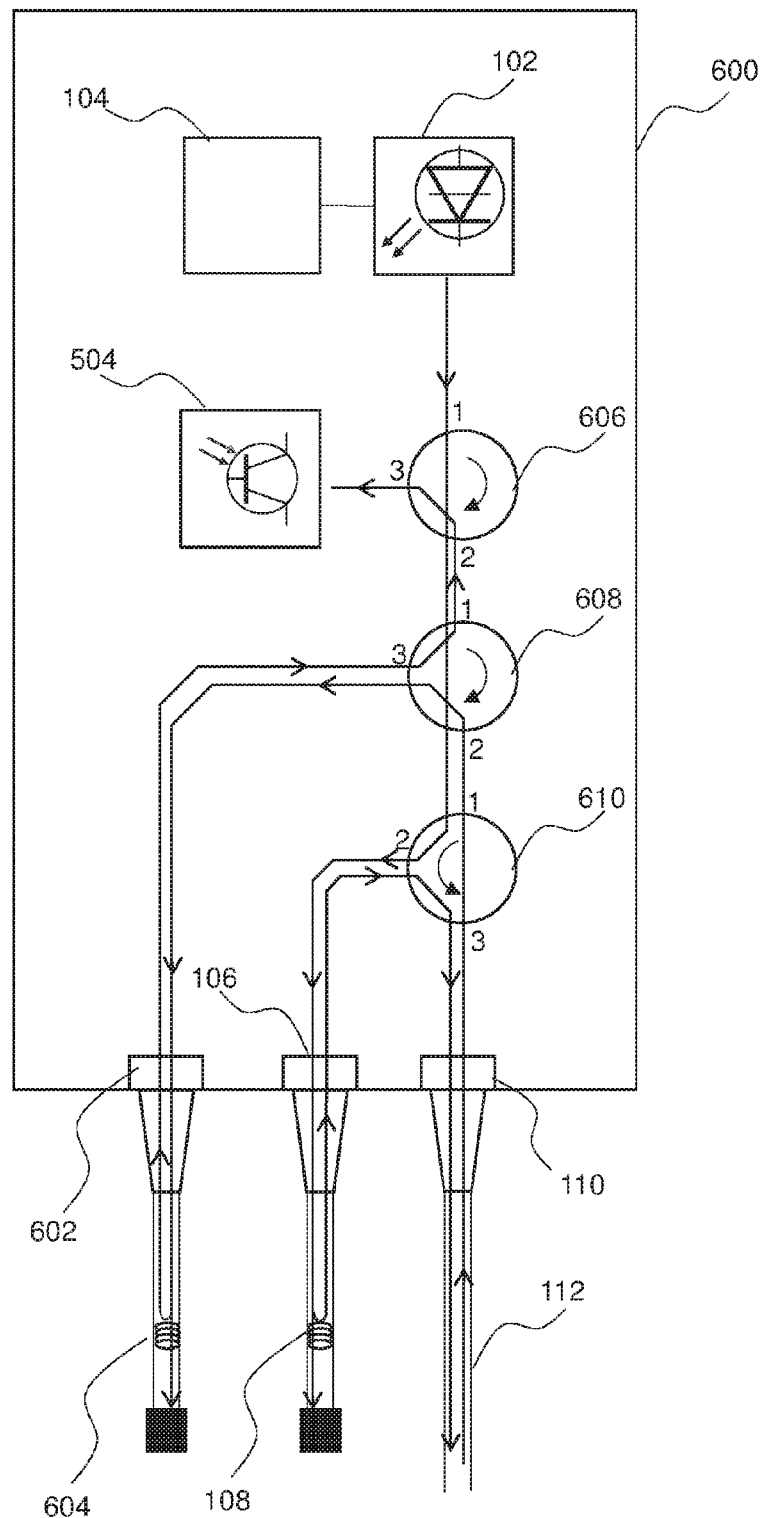
FIG. 6 is a schematic diagram illustrating an example of an avionics network of an embodiment of the invention.

FIG. 6 is a schematic diagram illustrating a further example of an avionics unit 600 that is arranged to both transmit optical signals across the optical network 300 and receive optical signals transmitted across the optical network 300, in accordance with an embodiment of the invention.

The avionics unit 600 shown in FIG. 6 comprises a light emitter 102, a first optical interface 106 and a second optical interface 110, similarly to the avionics unit 100 described with reference to FIG. 1. In use, a first removable wavelength selective filter 108 is optically connected to the first optical interface 106.

The avionics unit 600 shown in FIG. 6 also comprises a controller 104 to modulate the light emitter 102, in a manner similar to that described above with reference to FIG. 1.

The avionics unit 600 also comprises a light detector 504, similar to that described above with reference to FIG. 5. In addition, the avionics unit 600 shown in FIG. 6 comprises a third optical interface 602 to receive a second removable wavelength selective filter 604 to extract a narrowband optical signal from an optical signal received at the second optical interface 110. The third optical interface 602 is optically connected to the light detector 504.

In the embodiment shown in FIG. 6, the light detector 504 may be sensitive to a wide range of wavelengths. However, the light detector 504 will only detect optical signals extracted by the wavelength selective filter 604. For example, the light detector 504 may be a photodiode or phototransistor.

The avionics unit 600 further comprises a first optical circulator 606, a second optical circulator 608 and a third optical circulator 610. The first, second and third optical circulators 606, 608, 610 each comprise three ports: a first port, a second port and a third port (labelled 1, 2 and 3 respectively on each of the circulators 606, 608, 610 in FIG. 6).

The first port of the first optical circulator 606 is optically connected to the light emitter 102 to receive broadband modulated light from the light emitter 102. The second port of the first optical circulator 606 is optically connected to the first port of the second optical circulator 608, and the third port of the first optical circulator 606 is optically connected to the light detector 504.

The second port of the second optical circulator 608 is optically connected to the first port of the third optical circulator 610, and the third port of the second optical circulator 608 is optically connected to the third optical interface 602.

The second port of the third optical circulator 610 is optically connected to the first optical interface 106, and the third port of the third optical circulator 610 is optically connected to the second optical interface 110.

In use, when transmitting optical signals across the avionics network 300, broadband light emitted by the light emitter 102 is routed via the first, second, and third optical circulators 606, 608, 610 to the first wavelength selective filter 108 optically connected to the first optical interface 106. The first wavelength selective filter 108 filters a narrowband signal having a wavelength corresponding to a wavelength assigned to the avionics unit 600. The narrowband signal is then routed via the third optical circulator 610 to the second optical interface 110, from where it is then transmitted across at least part of the avionics network 300.

To receive optical signals transmitted across at least part of the avionics network 300, light (which may comprise multiplexed narrowband modulated optical signals each having a different wavelength) is received at the second optical interface 110. Light received at the second optical interface 110 is routed via the third and second optical circulators 610, 608 to the second wavelength selective filter 604 optically connected to the third optical interface 602.

The second wavelength selective filter 604 is tuned to selectively filter a narrowband optical signal having a particular wavelength range, so as to discriminate a signal intended to be detected at the avionics unit 600 from other signals comprised in the light received at the second optical interface 110. In some examples, the wavelength at which the avionics unit 600 is tuned to receive optical signals may be the same as the wavelength at which the avionics unit 600 is tuned to transmit signals. In other examples, the wavelength at which the avionics unit 600 is tuned to receive optical signals may be different to the wavelength at which the avionics unit 600 is tuned to transmit signals. That is, the second wavelength selective filter 604 may be tuned to the same wavelength as the first wavelength selective filter 108, or a different wavelength from the first wavelength selective filter 108. It will be understood that, in some examples, the avionics unit may comprise further optical circulators and further wavelength selective filters to transmit signals at more than one wavelength and/or receive signals at more than one wavelength.

The narrowband optical signal extracted by the second wavelength selective filter 604 is then routed via the second and first optical circulators 608, 606 to the light detector 504, whereupon it may be detected.

Figure 7:
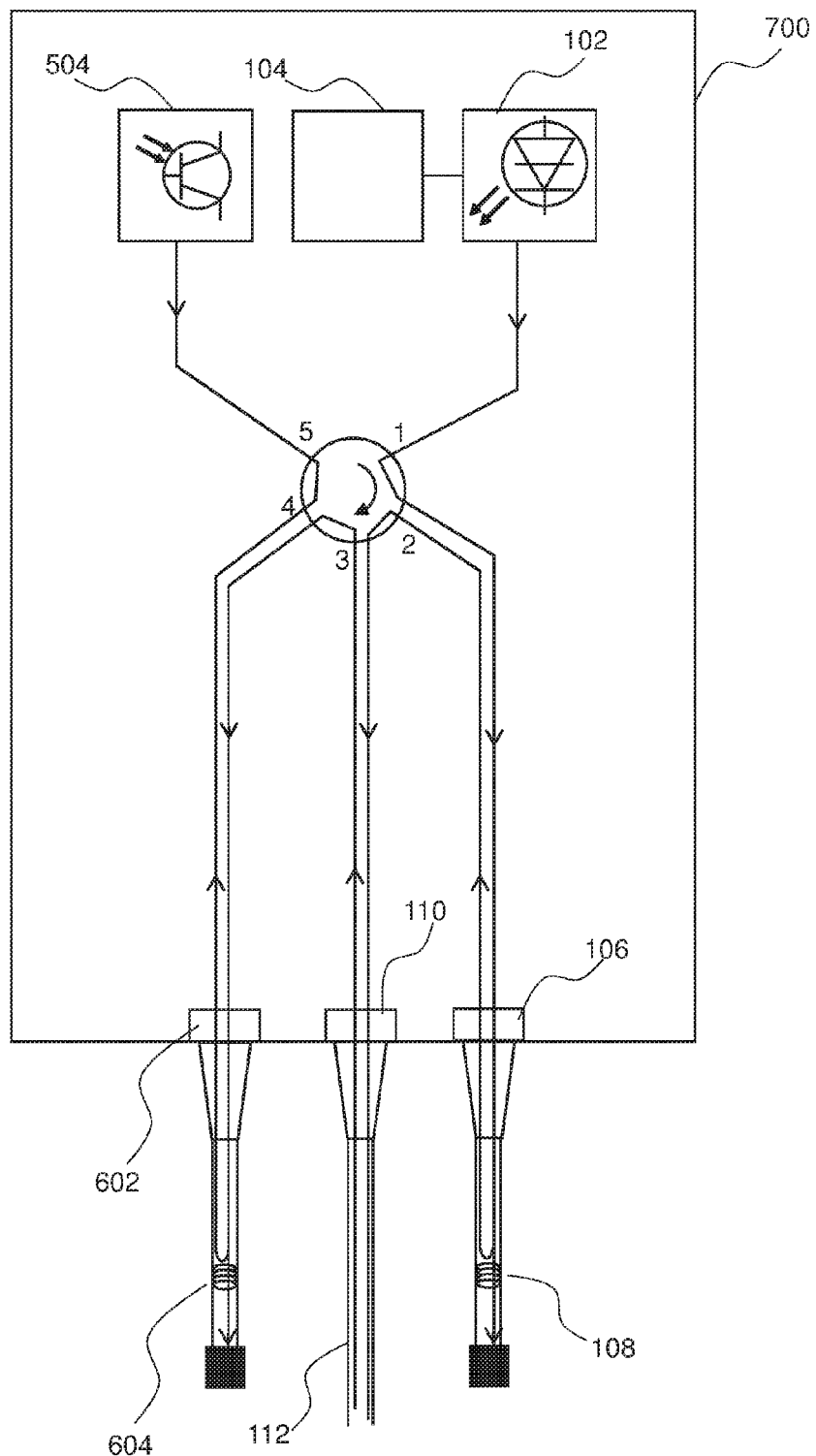
FIG. 7 is a schematic diagram illustrating an example of a wiring harness of an embodiment of the invention.

FIG. 7 is a schematic diagram illustrating a further example of an avionics unit 700 in accordance with an embodiment of the invention. The avionics unit 700 of FIG. 7 is arranged both to transmit optical signals across at least part of the optical network 300 and to receive optical signals transmitted across at least part of the optical network 300.

The avionics unit 700 shown in FIG. 7 comprises an optical emitter 102, a first optical interface 106 and a second optical interface 110, similar to those of the avionics unit 100 described with reference to FIG. 1. The avionics unit 700 shown in FIG. 7 also comprises a third optical interface 602 and a light detector 504, similar to those described with reference to FIG. 6.

In use, the avionics unit 700 shown in FIG. 7 routes broadband light emitted by the light emitter 102 via a first wavelength selective filter 108 to the second optical interface 110 for transmission across the avionics network. Furthermore, in use, the avionics unit 700 receives optical signals at the second optical interface 110 and routes those signals via the second wavelength selective filter 604 to the light detector 504.

To route optical signals in this way, the avionics unit shown in FIG. 7 comprises a single optical circulator 702 comprising five ports: a first port, a second port, a third port, a fourth port, and a fifth port (labelled 1 to 5 respectively in FIG. 7).

The first port is optically connected to the light emitter 102 to receive broadband light therefrom. The second port is optically connected to the first optical interface 106. The third port is optically connected to the second optical interface 110. The fourth port is optically connected to the third optical interface 602. The fifth port is optically connected to the light detector 504.

In the embodiments described above, the optical interfaces 106, 110, 602 may comprise any interface suitable for transmitting optical signals. For example, one or more of the optical interfaces may be optical input-output interfaces. In some embodiments, one or more of the optical interfaces 106, 110, 602 may comprise an expanded beam connector.

In the embodiments, described above, the light detector 504, where provided, may be any detector capable of detecting light. In some embodiments, the light detector may be one of a photodiode, a phototransistor, an active pixel sensor, a charge-coupled device or a direct-conversion radiation detector.

It will be understood that, although in some embodiments the wavelength selective filter(s) connected to an avionics unit may be part of a wiring harness, in other examples the wavelength selective filter(s) may be separate to the wiring harness. In some embodiments, the wavelength selective filter(s) may be supplied as keys arranged to plug into a corresponding port or optical interface of the avionics unit.

The avionics units described above may be supplied with or without the wavelength selective filter(s). In some embodiments, an avionics unit may be supplied with a wavelength selective filter connected to the first optical interface. In some such embodiments, the wavelength selective filter connected to the first optical interface may be removable from the first optical interface.

In some embodiments, one or each wavelength selective filter may comprise a non-reflective termination arranged to absorb or otherwise prevent reflection of unwanted wavelengths. This may help to prevent stray reflections leaking into the network, such as the avionics network 300, and interfering with the narrowband optical signal. Alternatively or additionally, one or each wavelength selective filter may be a non-return filter.

Each of the wavelength selective filters 108, 604 may be any filter suitable for filtering a relatively narrowband signal from a broadband signal. For example, one or each of the wavelength selective filters 108, 604 may comprise one of a fibre Bragg grating, a Fabry-Perot interferometer, a fibre interferometer, a diffraction grating, and a prism. The wavelength selective filter(s) of embodiments of the invention may be arranged to extract the narrowband optical signal in transmission or in reflection.

Each of the avionics units 100, 500, 600, 700 described above may be, for example, a Line Replaceable Unit (LRU) or any other type of avionics unit. The avionics network 300 may be, for example, an Integrated Modular Avionics (IMA) network.

Figure 8:
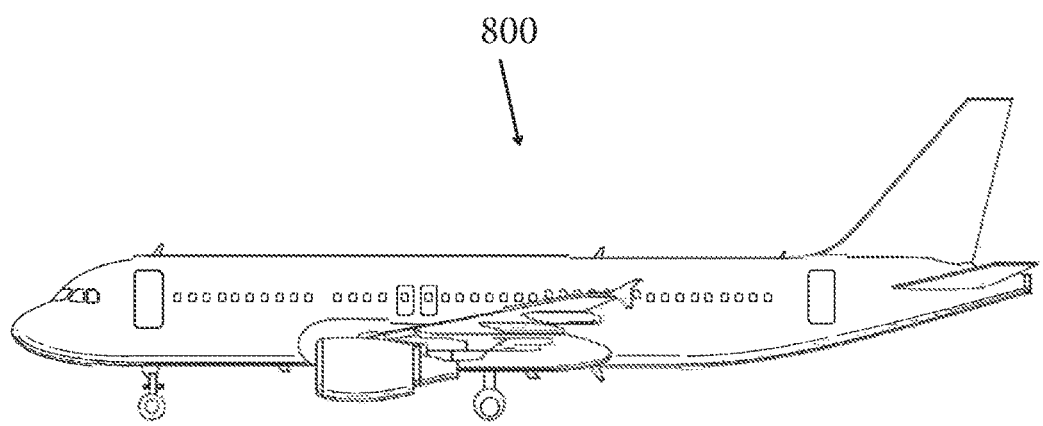
FIG. 8 is a schematic diagram of an example of a vehicle of an embodiment of the invention.

Referring to FIG. 8, there is shown a schematic side view of an example of a vehicle according to an embodiment of the invention. In the example of FIG. 8, the vehicle is an aircraft 800. The aircraft 800 may comprise one or more avionics networks, such as the avionics network 300 described above with reference to FIG. 3. The, or each, network 300 may comprise one or more avionics units, such as the avionics units 100, 500, 600, 700 described above with reference to FIGS. 1, 5, 6, and 7. The, or each, avionics network 300 may comprise one or more optical wiring harnesses, such as the optical wiring harness 302 described above with reference to FIG. 3. In other embodiments, the vehicle may be other than an aircraft, such as a road vehicle, a rail vehicle, a watercraft or a spacecraft.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

PARTS LIST

- 100—Avionics Unit
- 102—Light Emitter
- 104—Controller
- 106—First Optical Interface
- 108—Wavelength Selective Filter
- 110—Second Optical Interface
- 112—Optical Fibre
- 114—Optical Circulator
- 116—First Port
- 118—Second Port
- 120—Third Port
- 300—Avionics Network
- 302—Optical Wiring Harness
- 400—Method
- 402—Block (of Method 400)
- 404—Block (of Method 400)
- 406—Block (of Method 400)
- 500—Avionics Unit
- 502—Optical Circulator
- 504—Light Detector
- 506—Fourth Port
- 600—Avionics Unit
- 602—Third Optical Interface 604—Wavelength Selective Filter
606—First Optical Circulator
608—Second Optical Circulator
610—Third Optical Circulator
700—Avionics Unit
800—Aircraft

The invention claimed is:

1. An avionics unit for an avionics network, the avionics unit comprising:
    a light emitter configured to provide a modulated broadband optical signal;
    a first optical interface optically connected to the light emitter, the first optical interface being configured to receive a removable wavelength selective filter to extract a modulated narrowband optical signal from the modulated broadband optical signal; and
    a second optical interface optically connected to the first optical interface, the second optical interface being configured to output the modulated narrowband optical signal.

2. The avionics unit according to claim 1, comprising an optical circulator, the optical circulator comprising a first port optically connected to the light emitter, a second port optically connected to the first optical interface, and a third port optically connected to the second optical interface.

3. The avionics unit according to claim 2, comprising a light detector, wherein the optical circulator comprises a fourth port optically connected to the light detector.

4. The avionics unit according to claim 3, wherein the light detector is one of a phototransistor, a photodiode, an active pixel sensor, a charge-coupled device, and a direct-conversion radiation detector.

5. The avionics unit according to claim 1, comprising:
    a third optical interface to receive a removable wavelength selective filter to extract a narrowband optical signal from an optical signal received at the second optical interface; and
    a light detector optically connected to the third optical interface, the light detector being to detect the narrowband optical signal extracted from the optical signal received at the second optical interface.

6. The avionics unit according to claim 5, comprising a first optical circulator, a second optical circulator, and a third optical circulator, wherein the first, second and third optical circulators each comprise a first port, a second port, and a third port, wherein:
    the first port of the first optical circulator is optically connected to the light emitter, the second port of the first optical circulator is optically connected to the first port of the second optical circulator, and the third port of the first optical circulator is optically connected to the light detector;
    the second port of the second optical circulator is optically connected to the first port of the third optical circulator, and the third port of the second optical circulator is optically connected to the third optical interface; and
    the second port of the third optical circulator is optically connected to the first optical interface, and the third port of the third optical circulator is optically connected to the second optical interface.

7. The avionics unit according to claim 5, comprising an optical circulator comprising:
    a first port optically connected to the light emitter;
    a second port optically connected to the first optical interface;
    a third port optically connected to the second optical interface;
    a fourth port optically connected to the third optical interface; and a fifth port optically connected to the light detector.

8. The avionics unit according to claim 1, wherein the light emitter is a broadband laser diode or a white-light LED.

9. The avionics unit according to claim 1, wherein the avionics unit is a Line Replaceable Unit.

10. A system comprising:
    the avionics unit according to claim 1,
    wherein the removable wavelength selective filter is optically connected to the first optical interface of the avionics unit.

11. The system according to claim 10, wherein the wavelength selective filter is optically connected to the first optical interface of the avionics unit.

12. An avionics network comprising:
    the avionics unit according to claim 1; and
    an optical wiring harness,
    wherein the avionics unit is optically connected to the optical wiring harness.

13. The avionics network according to claim 12, wherein the optical wiring harness comprises the removable wavelength selective filter.

14. The avionics network according to claim 12, comprising a plurality of the avionics units and a plurality of the removable wavelength selective filters;
    wherein a first of the avionics units is optically connected to a first of the removable wavelength selective filters, and a second of the avionics units is optically connected to a second of the removable wavelength selective filters; and
    wherein the first removable wavelength selective filter is arranged to extract a first wavelength, and the second removable wavelength selective filter is arranged to extract a second wavelength, different to the first wavelength.

15. The avionics network according to claim 12, wherein the avionics network is an Integrated Modular Avionics network.

16. A method of operating the avionics network according to claim 12, the method comprising:
    modulating the light emitter to provide a modulated broadband optical signal;
    filtering, using the removable wavelength selective filter optically connected to the first optical interface, the modulated broadband optical signal to provide a modulated narrowband optical signal having a wavelength assigned to the avionics unit; and
    transmitting the modulated narrowband optical signal from the avionics unit via the second optical interface.

17. The method according to claim 16, wherein the avionics unit comprises a light detector, and a third optical interface optically connected to a removable wavelength selective filter to extract a narrowband optical signal from an optical signal received at the second optical interface, the method comprising:
    receiving a broadband optical signal via the second optical interface;
    filtering, using the removable wavelength selective filter optically connected to the third optical interface, the broadband optical signal to extract a modulated narrowband optical signal; and
    detecting the extracted modulated narrowband optical signal using the light detector.

18. The method according to claim 17, wherein the extracted modulated narrowband optical signal has a wavelength different to the wavelength assigned to the avionics unit.

19. A vehicle comprising the avionics unit according to claim 1.

20. The vehicle according to claim 19, wherein the vehicle is an aircraft.

21. An optical wiring harness for an avionics network, the optical wiring harness comprising:
   a first optical terminal comprising a removable wavelength selective filter for receiving a broadband modulated optical signal from a light emitter and transmitting a corresponding narrowband modulated optical signal to a second optical terminal, wherein the second optical terminal is configured to output the narrowband modulated optical signal.

* * * * *